(No Model.)

W. C. JENNINGS.
PLUG COCK.

No. 556,889. Patented Mar. 24, 1896.

WITNESSES:
Gustave Dieterich
John Kehlenbeck

INVENTOR
William C. Jennings
BY
Frank L. Crawford
ATTORNEY.

UNITED STATES PATENT OFFICE.

WILLIAM C. JENNINGS, OF CAMDEN, NEW JERSEY, ASSIGNOR TO THE FAIRBANKS COMPANY, OF NEW YORK, N. Y.

PLUG-COCK.

SPECIFICATION forming part of Letters Patent No. 556,889, dated March 24, 1896.

Application filed October 29, 1895. Serial No. 567,241. (No model.)

*To all whom it may concern:*

Be it known that I, WILLIAM C. JENNINGS, of the city of Camden, in the county of Camden and State of New Jersey, have invented certain new and useful Improvements in Plug-Cocks; and I do hereby declare the following to be a full, clear, and exact description of the invention, such as will enable others skilled in the art to which it appertains to make and use the same.

My invention relates to that class of cocks known as "plug-cocks," in which a plug, usually tapering in form, is inserted into a chamber in the body of the cock, which chamber is shaped to receive the plug, the body being furnished with suitable outlets and ports, and the plug being pierced with a fluid-way having ports connecting with and corresponding to those in the body, the plug also being provided with a stem. When it is desired to open the cock the plug is revolved by means of the stem until the ports of the fluid-way in the plug form a continuous passage with the ports in the body of the cock. When it is desired to close the cock the plug is revolved in like manner until the solid portions of the plug close the ports in the body. In plug-cocks in ordinary use it is very difficult to make the cock water-tight without at the same time making the revolving of the plug very difficult. When the joint between the plug and the body is packed, as with asbestos, for the purpose of making a tight joint, the friction is so great that it is not possible to use cocks having ports of more than a certain limited area.

The object of my invention is to construct a plug-cock in which, while the joint between the plug and the body is water-tight, the plug itself is easily revolved, the friction being reduced to a minimum and the cock being made of any desired size and the ports of any desired area.

My invention will be readily understood by reference to the accompanying drawings, which are hereby made a part of this specification, and in which similar letters refer to similar parts.

Figure 1:
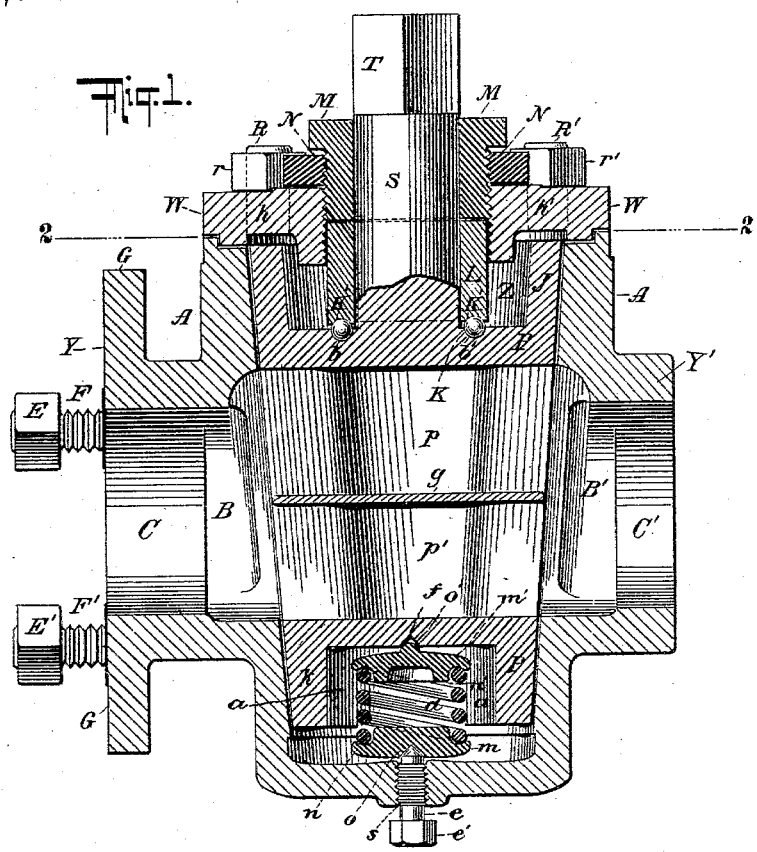
Figure 2:
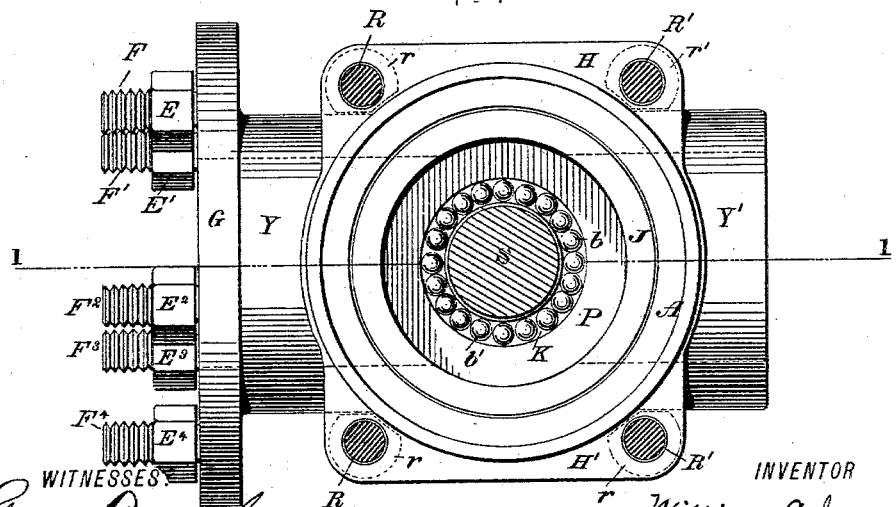

Figure 1 is a vertical section through the line 1 1 in Fig. 2. Fig. 2 is a cross-section through the line 2 2 in Fig. 1.

A is the body of a plug-cock having a conical chamber A' in which to receive the plug P. The body A has ports B B' conforming in size and shape to the ports $p$ $p'$ in the fluid-way of the plug P. The body A also has cylindrical outlets Y Y' intended to connect with conducting-pipes. The outlet Y has an annular flange G provided with bolts F F' $F^2$ $F^3$ $F^4$ and nuts E E' $E^2$ $E^3$ $E^4$, whereby the cock may be bolted to a conducting-pipe, if desired. The cylindrical outlets Y Y' have circular ports C C' connecting with the ports B B'.

The plug P is preferably of tapering shape and preferably having its upper part deeply recessed at Z with a continuous annular flange-like wall J about such recess Z. S is the stem of the plug having a square T, the same being rigidly united with the body of the plug. Around the base of the stem and upon the upper surface of the main part of the plug is an annular groove K, containing balls $b$ $b'$, preferably of steel, sufficient in number and of suitable size to fill the groove K, so as to form antifriction-rollers.

L is a collar large enough to pass easily over the stem and having an annular groove K' in its lower perimeter corresponding to and of the same curve in cross-section as the annular groove K. When the collar L is passed over the stem S its lower perimeter rests upon the balls $b$ $b'$, and the balls, together with the annular grooves K K', form a ball-bearing or series of antifriction-rollers.

W is a bonnet or lid having a central circular opening of diameter somewhat greater than the diameter of the stem and being pierced at the corners with the circular holes $h$ $h'$ through which pass bolts R R', which are provided with nuts $r$ $r'$, by which bolts and nuts the bonnet W may be clamped tight to the flanges H H' upon the body A, said flanges being similarly pierced for the reception of the bolts. The inner surface of the circular opening in the bonnet W has cut upon it a screw-thread.

M is an adjustable collar fitting round the stem S and having upon its outer surface a screw-thread corresponding to the thread cut upon the bonnet W and engaging with the same, so that the adjustable collar M may be screwed into the circular opening in the bonnet W until the collar M rests upon and presses against the collar L, thereby exerting any desired pressure upon the balls $b\ b'$.

N is an annular lock-nut threaded upon its inner surface and engaging with the adjustable collar M.

The ports $p\ p'$ in the plug P are preferably separated by a brace or partition $g$, which is, however, not essential to my invention. In the lower part of the plug is a recess $a$ surrounded by an annular wall $k$.

$d$ is a spiral spring of suitable size, its lower end resting on a suitable boss $m$ having an annular flange $n$, and having on its under side a concave conical center $o$ to receive the end of an adjusting-screw $e$, which passes through a central circular opening $s$ in the bottom of the body A, said opening $s$ having a screw-thread with which the screw $e$ engages. The upper part of the spring rests against a similar boss $m'$ having an annular flange $n'$, and on its upper side a convex conical center $o'$, which bears in a conical recess $f$ in the bottom of the plug P. The opening $s$ and recess $f$ should preferably be so located with reference to each other and to the plug P that the axis of the plug P extended will pass through their centers. The diameters of the flanges $n\ n'$ on the bosses $m\ m'$ should preferably be such that they will just fit within the spirals of the spring $d$. This arrangement of parts will keep the bosses $m\ m'$ and spring $d$ central with the body A and plug P, thus supporting the plug P symmetrically. The screw $e$, having a polygonal head $e'$ to fit a wrench, is used to adjust the tension of the spring $d$ when necessary, so as to raise and lower the plug P to prevent its becoming set against the wall of the chamber and yet to keep it in such contact with the wall of the chamber that the plug-cock will be water-tight.

If now the plug is inserted in the chamber, the balls $b\ b'$ being in place and the collar L is slipped over the stem S and allowed to rest upon the balls $b\ b'$, and if the bonnet W is screwed fast to the flanges H H' and the adjustable collar M and lock-nut N are put in place and screwed to the necessary tightness, (the collar M pressing against the collar L and the lock-nut N holding the collar M at the proper point by locking against the bonnet W,) it will be possible so to graduate the pressure upon the ball-bearing that the plug, while it forms a water-tight joint with the wall of the chamber, will nevertheless revolve readily on slight pressure, it being balanced between the spring $d$ and the ball-bearing. The annular wall J, being of considerable height, assists in forming a tight joint.

Though I prefer to use the spring $d$, yet some other adjustable device might be employed, such as a screw passing through the bottom of the body A and impinging directly against the bottom of the plug at the conical recess $f$.

In place of the form of ball-bearing particularly described some other form of antifriction-roller might be employed, the other parts being varied to conform to the same.

In place of the adjustable collar M with the lock-nut N, I may employ any other convenient device which may be suitable for transmitting graduated pressure from the bonnet W to the plug P through the ball-bearings or other device for employing antifriction-rollers. The collar L may also be dispensed with or may form part of the adjustable collar M. The annular wall $k$ may be dispensed with. The recessed chamber Z in the top of the plug P may be shallower than is shown in the drawings or may be entirely dispensed with, care being taken, however, by the proper arrangement of the parts to leave a small space between the upper perimeter of the annular wall J (or the upper surface of the plug P where the recess Z is dispensed with) and the bonnet W when the same is clamped into position, thus allowing for a small play vertically of the plug, so that the pressure upon the ball-bearings may be graduated, and so that the spring $d$ may have room in which to operate. A small space should also be left between the perimeter of the annular wall $k$ where the latter is employed and the bottom of the chamber into which the plug fits.

I am aware that a ball-bearing has been used heretofore in connection with a plug-cock. I am also aware that spiral springs have been used in the same connection for various purposes. I am not aware, however, that ball-bearings and a spiral spring have been used together with a plug-cock to accomplish the purpose which I accomplish by my invention.

With the parts arranged substantially as described herein the plug is virtually supported or balanced between the ball-bearings and the spring $d$ with just sufficient pressure against the sides of the chamber to make the joint between the plug and the body water-tight without preventing the easy revolution of the plug.

If the plug P becomes worn, so as to fit less tightly in the body, the adjustable collar M may be screwed down farther, thus compressing the spring $d$ somewhat more, (a space being left for this purpose between the perimeter of the annular wall $k$ and the bottom of the body A.) The joint between the plug and the body will then remain sufficiently tight, the proper pressure upon the plug will be maintained, and the plug will still be balanced between the ball-bearing and the spring $d$. The adjusting-screw $e$ also permits the spring $d$ to be raised any desired distance, so as to assist in the more perfect adjustment of the various parts and so as to maintain a perfect joint between the plug and the body, coupled with ease of revolution.

I do not claim broadly the use of a ball-bearing in connection with a plug-cock, nor the use of a spiral spring in the same connection; but What I do claim, and desire to secure by Letters Patent, is—

In a plug-cock, the combination with a suitable body having a plug-receiving chamber, suitable ports and outlets and flanges projecting from the body near the aperture of the chamber; a plug having a fluid-way, suitable ports and a stem, and provided with an external recess in the bottom of the plug, surrounded by an annular wall, and with an annular groove in the upper surface of the plug around the base of the stem; a bonnet or lid encircling the stem of the plug and adapted to be clamped to the flanges projecting from the body; suitable devices for such clamping; an adjustable collar encircling the stem and engaging by screw-threads with the inner surface of the circular opening in the bonnet or lid; a lock-nut encircling the adjustable collar and engaging with the same; said adjustable collar having an annular groove in its lower perimeter corresponding in diameter and shape with the annular groove in the top of the plug; antifriction-balls fitted to the said annular grooves, so as to rest between the perimeter of the adjustable collar and the upper surface of the plug in such a way as to form a ball-bearing; a suitable spiral spring resting between movable flanged bosses which impinge against the bottom of the chamber and the bottom of the plug respectively, and a suitable adjustable screw passing through the bottom of the body into the chamber and impinging against the lower boss, substantially as and for purposes set forth.

WILLIAM C. JENNINGS.

In presence of—
FRANK L. CRAWFORD,
JOSEPH F. O'BRIEN.